(12) United States Patent
Mc Kee et al.

(10) Patent No.: US 6,211,297 B1
(45) Date of Patent: Apr. 3, 2001

(54) PROCESS FOR PREPARING RUBBER-MODIFIED MOULDING COMPOUNDS

(75) Inventors: Graham Edmund Mc Kee, Neustadt; Stephan Jüngling, Mannheim; Volker Warzelhan, Weisenheim; Hermann Gausepohl, Mutterstadt, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/319,596

(22) PCT Filed: Nov. 28, 1997

(86) PCT No.: PCT/EP97/06650

§ 371 Date: Jun. 8, 1999

§ 102(e) Date: Jun. 8, 1999

(87) PCT Pub. No.: WO98/25980

PCT Pub. Date: Jun. 18, 1998

(30) Foreign Application Priority Data

Dec. 10, 1996 (DE) .............................................. 196 51 300

(51) Int. Cl.$^7$ ............................ C08L 23/00; C08L 23/04; C08L 33/02
(52) U.S. Cl. ......................... 525/221; 525/240; 525/242; 525/299
(58) Field of Search ................................... 525/221, 240, 525/242, 299

(56) References Cited

U.S. PATENT DOCUMENTS 5,561,207 * 10/1996 Wang et al. .......................... 526/262
5,670,591 * 9/1997 Wang et al. .......................... 526/173
5,677,387 * 10/1997 Bayard et al. ........................ 525/299
5,686,534 * 11/1997 Bayard et al. ........................ 525/271

FOREIGN PATENT DOCUMENTS

96/15167   5/1996  (WO) .
96/28487   9/1996  (WO) .

OTHER PUBLICATIONS

Segall et al. *J. Appl. Pol. Sci*, 58/2 (1995) 385–399.
Kohkame et al. *J. Appl. Pol. Sci*, 46/10 (1992) 1775–1784.

* cited by examiner

Primary Examiner—Nathan M. Nutter
(74) Attorney, Agent, or Firm—Keil & Weinkauf

(57) ABSTRACT

Preparation of rubber-modified molding compositions comprises $a_1$) anionic polymerization of a mixture (A) comprising acrylate derivatives or methacrylate derivatives or acrylate derivatives and methacrylate derivatives and a solvent, if desired comprising olefinically unsaturated compounds which are not an acrylate derivative or a methacrylate derivative, or $a^2$) sequential anionic polymerization of acrylate derivatives or methacrylate derivatives or acrylate derivatives and methacrylate derivatives in the presence of a solvent which, if desired, comprises olefinically unsaturated compounds to give block copolymers, and b) subjecting the reaction mixture obtained in $a_1$) or $a_2$) or $a_1$) and $a_2$) to a free-radical-initiated polymerization, if desired after the addition of unsaturated compounds.

13 Claims, No Drawings

PROCESS FOR PREPARING RUBBER-MODIFIED MOULDING COMPOUNDS

This application claims benefit of priority from PCT/EP 97/06550, filed Nov. 28, 1997.

BACKGROUND OF THE INVENTION

The present invention relates to a process for the preparation of rubber-modified molding compositions. The invention also relates to the rubber-modified molding compositions obtainable by the novel process and to their use for the production of fibers, films and shaped articles. The invention also relates to polymer blends comprising these rubber-modified molding compositions.

PRIOR ART

Processes for the production of rubber-modified molding compositions are sufficiently well known. In DE-A 24 27 960, for example, molding compositions made from ABS (polybutadiene rubber particles, grafted with polystyrene-acrylonitrile in a polystyrene-acrylonitrile matrix) and a process for their preparation are described.

For the preparation of acrylonitrile-styrene-acrylate (ASA) molding compositions, the starting material is generally an acrylate rubber, onto which copolymers based on styrene and acrylonitrile are grafted by polymerization with a mixture of these monomers. The preparation of ASA molding compositions can be carried out, for example, in emulsion or in solution.

The preparation of ASA molding compositions in emulsion is described, for example, in DE 32 06 136, 31 49 046, 31 49 358, 32 27 555, 31 29 378, 31 29 472, 29 40 804, 28 26 925 and 19 11 882. The rubber is prepared here from n-butyl acrylate and small amounts of two monomers containing double bonds, in emulsion. A disadvantage of this process is that relatively large amounts of water are produced in the emulsion polymerization and in the precipitation of the polymer dispersion, and these must be removed and disposed of as waste water which requires treatment. Furthermore, the molding compositions prepared by the process have an impact strength and tear resistance which is not adequate for all applications. In addition, the surface gloss of the shaped articles produced from these molding compositions cannot be varied over a wide range.

EP 0 095 919 and DE 11 82 811 describe a process for preparation of ASA molding compositions in solution.

According to EP 0 095 919, there is no grafting of the comonomers onto the rubber, ie. no effective coupling at the interface. According to DE 11 82 811, the rubber made from n-butyl acrylate with from 0.5 to 10% by weight of a comonomer is prepared with two double bonds capable of free-radical polymerization. The polymerization of the styrene-acrylonitrile (SAN) monomer mixture is initiated at a rubber conversion of from 10 to 80%. This has the result that the grafted proportion of the rubber does not have the same make-up as the polymer matrix, and this leads to poorer mechanical properties of the molding compositions. In addition, the polymerization of rubber units into the graft shell, ie. the graft branches, gives a poorer heat resistance of the products.

In the earlier German Patent Application DE-A-44 40 672.6, rubber-modified ASA molding compositions with improved impact strength, tear resistance and elongation at break are obtained by the additional use, in the free-radical build-up of the graft core, of a monomer having two or more double bonds, creating grafting points for the growing chains of the shell and matrix and reducing the low-molecular-weight proportion of the rubber.

A disadvantage of the known free-radical processes in the construction of polymers or copolymers is that generally at least some steps have to be carried out in aqueous systems; especially on an industrial scale, this requires complicated and costly treatment of the contaminated water. It is also disadvantageous if during the course of the process the reaction medium has to be changed in a complicated manner, as in the preparation according to the abovementioned earlier application DE-A-44 40 676.2, where free-radical polymerization of n-butyl acrylate in cyclohexane is carried out in the first step and then, after removal of the solvent, the polymerization is continued in an aqueous medium, in order to obtain the desired rubber-modified molding composition.

Using the known free-radical methods under the usual process conditions, it is also impossible, or possible only to a very limited extent, to obtain rubber particles with high molecular weight in the presence of monomers which have a tertiary hydrogen atom. Operation at low temperatures with the aim of inhibiting the chain transfer reaction leads to long reaction times which are commercially unacceptable.

The conventional free-radical emulsion processes also mostly require the addition of emulsifiers, such as alkyl metal salts of alkyl- or alkylarylsulfonic acids or sulfosuccinates, in order to ensure a stable emulsion. It is frequently impossible completely to remove the emulsifiers, and also the precipitation reagents, such as calcium chloride or magnesium sulfate, required for the isolation of the rubber-modified polymer from the thermoplastic molding composition. This can result in firstly a worsening of the rheological and mechanical properties and secondly, through the phenomenon of exudation and the formation of specks, can permanently impair the surface quality and the pigment-ability of the fibers, films and shaped articles which are produced.

It would therefore be desirable to be able to prepare rubber-modified molding compositions without the necessity for a change of solvent, or even for a conventional solvent at all.

SUMMARY OF THE INVENTION

It is an object of the present invention to provide a process for the preparation of rubber-modified molding compositions which in its entirety, virtually in its entirety or in at least one significant step, does not require water and/or, if desired, also does not require relatively large proportions of conventional solvents and which furthermore allows the formation of high-molecular-weight rubber particles even when monomer components which carry a tertiary hydrogen atom are present.

DETAILED DESCRIPTION OF THE INVENTION

We have found that this object is achieved by means of a process for the preparation of rubber-modified molding compositions in which, in a first step $a_1$), a mixture (A) comprising acrylate derivatives or methacrylate derivatives or acrylate derivatives and methacrylate derivatives and a solvent, if desired comprising olefinically unsaturated compounds which are not an acrylate derivative or a methacrylate derivative are subjected to an anionic polymerization or, in a step $a_2$), acrylate derivatives or methacrylate derivatives or acrylate derivatives and methacrylate derivatives are sequentially anionically polymerized in the presence of a solvent which, if desired, comprises olefinically unsaturated compounds to give block copolymers, and in which, in a further step b), the reaction mixture obtained in the first reaction step $a_1$) or $a_2$) or in the reaction steps $a_1$) and $a_2$) is subjected to a free-radical-initiated polymerization, if desired after the addition of further unsaturated compounds.

The invention also provides rubber-modified molding compositions obtainable by the novel process and the use of the molding compositions for the production of fibers, films and shaped articles. The invention additionally provides polymer blends comprising these rubber-modified molding compositions.

The following monomeric building blocks are preferably used as acrylate derivatives or methacrylate derivatives:

i) compounds of the formula (I)

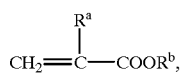
(I)

where
$R^a$ is hydrogen or methyl,
$R^b$ is alkyl having from 1 to 32 carbon atoms, ii) compounds of the formula (II)

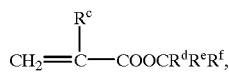
(II)

where
$R^c$ is hydrogen or methyl,
$R^d, R^e$ are hydrogen, alkyl or aryl,
$R^f$ is $C_1–C_{20}$-alkyl or $C_1–C_{20}$-aralkyl containing at least one tertiary hydrogen atom or at least one benzylic hydrogen atom, iii) compounds having one or more double bonds in the ester unit, iv) di- or polyesters or -ethers of di- or polyhydric alcohols, v) acrylamides or methacrylamides, nitrogen-functional acrylates and methacrylates, aromatic and araliphatic (meth)acrylates and (meth)acrylates substituted with functional groups based on the elements of Groups IVA, VA, VIA, VIIA of the Periodic Table of the Elements.

These compounds may be used individually or in any desired mixture.

Particularly suitable compounds i) are $C_1–C_{20}$-alkyl acrylates and $C_1–C_{20}$-alkyl methacrylates, ie. compounds where the radical $R^b$ in (I) is methyl, ethyl, n-propyl, isopropyl, n-butyl, isobutyl, tert-butyl, n-pentyl, isopentyl, n-hexyl, n-heptyl, n-octyl, n-nonyl, n-decyl, n-dodecyl, n-tetradecyl, n-hexadecyl, n-octadecyl or n-eicosyl.

Preferred monomers ii) are compounds (II) where the radical —$C(R^d)(R^e)(R^f)$ is 2-methylpropyl, 2-methylbutyl, 2-methyloctyl, 2-ethylbutyl, 2-ethylpentyl, 2-ethylhexyl, 2-ethyloctyl, 2-phenylethyl, 2-phenylpropyl, 2-phenylbutyl, 2-phenylpentyl, 2-phenylhexyl, 2-phenyloctyl, 3-methylbutyl, 3-methylpentyl, 3-methylhexyl, 3-methyloctyl, 3-ethylpentyl, 3-ethylhexyl, 3-ethyloctyl, in particular 2-ethylhexyl.

Suitable monomers iii) are in particular allyl acrylate, allyl methacrylate, 2-allyloxyethyl acrylate, 2-allyloxyethyl methacrylate, dihydrodicyclopentadienyl acrylate, dihydrodicyclopentadienyl methacrylate, 4-vinylbenzyl acrylate, 4-vinylbenzyl methacrylate, 3-vinylbenzyl acrylate and 3-vinylbenzyl methacrylate.

Suitable monomers iv) are butanediol di(meth)acrylate, ethanediol di(meth)acrylate, glycerol triacrylate and glycerol trimethacrylate.

Examples of preferred compounds v) are N,N-dimethylarylamide, N,N-diethylacrylamide, N,N-dimethylmethacrylamide, N,N-diethylmethacrylamide, N,N-di-isopropylacrylamide, N,N-di-n-butylacrylamide, N,N-di-isopropylmethacrylamide, N,N-di-n-butylmethacrylamide, glycidylacrylamide and glycidylmethacrylate.

The monomer types i) to v) may each be used in the novel process alone, as individual compound or as mixture of compounds of one monomer type or in any desired mixture. They may also be polymerized sequentially to obtain block copolymers.

Solvents for the novel process are olefinically unsaturated compounds which are not an acrylate derivative or a methacrylate derivative. These compounds may either be the only solvent in which the anionic polymerization takes place or may be a solvent constituent together with another solvent component. In a preferred embodiment, vinylaromatic compounds are used as solvent or solvent component. In a further embodiment, the solvent contains no olefinically unsaturated compounds.

In principle, suitable olefinically unsaturated compounds are those which are described, for example, by the formula (III):

where:
$R^1$, $R^2$ independently of one another, are hydrogen, unsubstituted or substituted, straight-chain or branched, $C_1–C_{14}$-alkyl such as methyl, ethyl, isopropyl, n-propyl, isobutyl, n-butyl, tert-butyl, unsubstituted or singly- or multiply substituted $C_6–C_{14}$-aryl, such as phenyl or tolyl, unsubstituted or substituted $C_3–C_7$-cycloalkyl, such as cyclopropyl, cyclopentyl or cyclohexyl, $C_2–C_{10}$-alkenyl, such as vinyl, allyl, butenyl or butadienyl, and $R^3$, $R^4$ independently of one another, are hydrogen, unsubstituted or substituted, straight-chain or branched, $C_1–C_{14}$-alkyl such as methyl, ethyl, isopropyl, n-propyl, isobutyl, n-butyl, tert-butyl, unsubstituted or singly- or multiply substituted $C_6–C_{14}$-aryl, such as phenyl or tolyl, unsubstituted or substituted $C_3–C_7$-cycloalkyl, such as cyclopropyl, cyclopentyl or cyclohexyl, $C_2–C_{10}$-alkenyl, such as vinyl, allyl, butenyl or butadienyl, or, together with C', are singly- or multiply-substituted cyclopropyl, cyclopentyl or cyclohexyl.

Examples of suitable olefinically unsaturated compounds are ethylene, propylene, 1-butene, 2-butene, butadiene, 1,4-hexadiene, 1,5-hexadiene and 1-octene. The radicals $R^1$, $R^2$ and/or $R^3$, $R^4$ and the radicals $R^1$, $R^3$ and/or $R^2$, $R^4$ can respectively form an unsaturated carbocycle or heterocycle, such as cyclopentene or cyclohexene.

Examples of vinylaromatic compounds particularly suitable as solvents or solvent components for the novel process are styrene, α-methylstyrene, o-, m- and p-methylstyrene and any desired mixtures of the abovementioned vinylaromatic compounds. Styrene, and also butadiene and ethene, are preferably used as solvent or as solvent component, styrene being particularly preferred. If vinylaromatic compounds and/or the unsaturated compounds as claimed in claim 1 form a component of a solvent system, then the proportion of this component, based on the total amount of solvent, is preferably in the range from 5 to 99% by volume.

Dimethoxyethane, diethyl ether, tetrahydrofuran, toluene, ethylbenzene, cyclohexane or any desired mixture of the abovementioned solvents may be used as further solvent constituents or solvents. Examples of suitable solvent systems for the novel process are styrene/tetrahydrofuran, styrene/toluene and styrene/tetrahydrofuran/ethylbenzene.

In principle any inert, aprotic polar or non-polar solvent may be used.

In the anionic polymerization processes commonly used, the acrylate derivatives or methacrylate derivatives or any desired mixtures of these, in the solvents described, give homopolymers, copolymers and block copolymers. The initiator systems known for anionic polymerization, as also described in J. M. S.-Rev. Macromol. Chem. Phys., 1994, C34, pp. 234–324 may also be used here.

An example of an initiator system which has proven suitable consists of, as initiator, a metal alkyl compound, preferably an alkali metal, or a mixture of different metal alkyl compounds, and an alkali metal alkoxide as chelating additive. An initiator formulation of this type is found in EP-A 0 524 054, with diphenylmethyllithium named as preferred starter and the lithium salt of $CH_3(OCH_2CH_2)_2OH$ as additive, and likewise in EP 0 668 297, in which, besides the abovementioned initiator system, bimetallic alkoxy-alkoxides are highlighted.

Examples of chelating additives are $CH_3(OCH_2CH_2)OLi$, $CH_3(OCH_2CH_2)_2OLi$, $CH_3(OCH_2CH_2)_3OLi$, n-Bu $(OCH_2CH_2)_2OLi$ and $Et(OCH_2CH_2)_2OLi$ or mixtures of these. In addition, suitable uncharged chelating additives are macrocyclic polyethers and cryptands, such as benzo-15-crown-5, benzo-18-crown-6,1,4,7,10-tetraoxacyclododecane, 1,4,7,10,13-pentaoxacyclooctadecane, 2,3,11,12-dibenzo-1,4,7,10,13,16-hexaoxacyclooctadecane-2,11-diene, 1,10-diaza-4,7,13,16,21,24-hexaoxabicyclo[8.8.8]hexacosane or 5,6-benzo-4,7,13,16,21,24-hexaoxa-1,10-diazabicyclo[8.8.8] hexacosane.

A further, likewise preferred, anionic initiator system for the novel process is based on (A$_1$) metal alkoxides of the formula ($\alpha$) or ($\beta$) as chelating additives

 (α),

 (β), where
each of $R^{1'}$ and $R^{2'}$, independently of one another, and $R^{4'}$ may be the alkyl group methyl, ethyl, isopropyl, n-propyl, isobutyl, n-butyl or tert-butyl; the cycloalkyl group cyclopropyl, cyclopentyl or cyclohexyl; the alkylaryl group benzyl; the aromatic group phenyl; or the heteroaromatic group pyridyl,
$R^{3'}$ is, for example, methylene, ethylene, n-propylene, isopropylene, ethoxyethyl or phenylene,
$R^{5'}$ and $R^{6'}$, independently of one another, are the aryl group phenyl; the alkylaryl group benzyl; the alkyl group methyl, ethyl, isopropyl, n-propyl, isobutyl, n-butyl or tert-butyl and
M, $Z^1$ and $Z^2$, independently of one another, are metal cations selected from the group consisting of the alkali metals, in particular lithium, and (B$_1$) alkali metal alkyl compounds or alkaline earth metal alkyl compounds as initiator.

Examples of the alkali metal alkoxides of the formulae ($\alpha$) and ($\beta$) are the lithium salts of 2-dimethylaminoethanol, 2-diethylaminoethanol, 2-diisopropylaminoethanol, 1-(dimethylamino)-2-propanol, 2-dibutylaminoethanol, 2,2'-(n-butylimino)bisethanol, 1,1'-(methylimino)bis-2-propanol, 2-[2-(dimethylamino)ethoxy]ethanol, 2-diphenylaminoethanol, 2-(ethylphenylamino)ethanol, 2-[ethyl-(3-methylphenyl)amino]ethanol, 3-(ethylamino)-4-methylphenol, 3-diethylaminophenol, 2,2'-(phenylimino) bisethanol and 2,2'-[(3-methylphenyl)imino]bisethanol. Preference is given to the lithium salts of 2-dimethylaminoethanol, 2-diethylaminoethanol, 2-diisopropylaminoethanol, 2-diethylaminoethanol, 2-diisopropylaminoethanol, 1,1'-(methylimino)bis-2-propanol and 2-[2-(dimethylamino)ethoxy]ethanol. Particular preference is given to the lithium salts of 2-dimethylaminoethanol and 1,1'-(methylimino)bis-2-propanol. The alkali metal alkoxides can be obtained by well known processes from the corresponding aminoalcohols by treatment with bases. For example, lithium 2-dimethylaminoethoxide is prepared by deprotonizing 2-dimethylaminoethanol at 0° C. using sec-butyllithium.

The anionic initiator compounds for the novel process can generally be alkali metal alkyl or alkali metal alkylaryl compounds, the alkyl radical preferably having from 1 to 10, particularly preferably from 1 to 6 carbon atoms. The alkylaryl compounds preferably have a $C_1$–$C_{10}$-alkyl group and a $C_6$–$C_{14}$-aryl group, a particularly preferred aryl radical being phenyl or substituted phenyl. Suitable alkylaryl compounds are alkali metal compounds derived, for example, from styrene, α-methylstyrene or 1,1-biphenylethene, obtained by reaction with, for example, n-butyllithium, sec-butyllithium or tert-butyllithium. Examples of frequently used alkylaryl compounds and alkali metal alkyl compounds are: n-butyllithium, sec-butyllithium, tert-butyllithium, diphenylmethyllithium, diphenylmethylsodium, diphenylmethylpotassium, 1-phenylhexyllithium and 1,1-diphenylhexyllithium.

It is also possible for the anionic initiator compounds used to be alkali metal amides, alkali metal ester enolates or alkali metal ketoenolates. Of these, the following are preferred: lithium diisopropylamide, lithium ethyl isobutyrate and the lithium enolate of diisopropyl ketone.

If initiator systems based on anionic initiators are used in the first step $a_1$) or $a_2$) respectively, of the novel process, it is preferable to use, besides the vinylaromatic compound, one or more further solvent components.

The further components are preferably inert non-polar and polar solvents. Examples of these are aromatic hydrocarbons, such as toluene, benzene, xylene and ethylbenzene, and aliphatic hydrocarbons, such as cyclohexane, hexane, pentane and tetrahydrofuran. Mixtures of non-polar solvent components, such as mixtures of toluene with ethylbenzene, and mixtures of non-polar and polar solvents, such as mixtures of ethylbenzene and tetrahydrofuran, may also be used as solvent component.

Generally, for example, the styrene proportion of the total amount of solvent is in the range from 10 to 100% by volume, preferably in the range from 20 to 99% by volume, particularly preferably from 30 to 95% by volume, if the anionic polymerization is initiated with alkali metal alkyl compounds or alkaline earth metal alkyl compounds.

The solvent component used in addition to the vinylaromatic compound preferably consists of non-polar solvents or of solvent mixtures consisting essentially of non-polar and, with these, polar constituents. For example, a mixture of ethylbenzene and tetrahydrofuran with a mixing ratio in the range from 55:45 to 99:1, preferably from 80:20 to 95:5, may be employed as solvent component.

The novel processes in the presence of an anionic initiator can be employed either as batch processes or as continuous processes. In principle, the components of the initiator formulation, the solvent and the monomers can be mixed with one another in varying sequences. For example all of the initiator components can be precharged, followed by addition of solvent(s) and monomer(s). The components of the initiator system can, moreover, be added to the monomer solution either in separate solutions, simultaneously or in succession, the organometallic compound generally being precharged, or as a mixture prepared in an inert solvent or solvent system. The monomer solution is preferably added to the initiator system. In the batch process, the amount of monomer(s) may be added all at once, in portions or continuously, with any desired gradient.

Especially in the continuous mode of operation, it has proven advantageous to feed the initiator system and the monomer solution simultaneously or virtually simultaneously, if desired under turbulent mixing conditions, into the reaction vessel. For this, the monomer solution and the initiator solution are mixed in a mixing nozzle of low volume under turbulent flow conditions and then fed through a tube with a narrow cross-section, which may be equipped with static mixers (eg. Sulzer SMX-Mixer). The rate of flow should be sufficiently high for a relatively uniform residence time to be observed. A second monomer can be added in a further, downstream mixing nozzle.

The reaction can be carried out, for example, in the range from −78° C. to +80° C., the range from −55° C. to +50° C. being preferred. The reaction temperature can either be held constant or increased in a controlled manner. In order to achieve high molecular weights $M_n$ and narrow molecular weight distributions, it is not harmful if the reaction mixture becomes warm within a short period of time as a result of the enthalpy of reaction which is liberated.

After the molecular weight has been built up, the polymerization reaction is terminated by adding a protic substance, such as an alcohol (eg. methanol, ethanol or isopropanol), an acid (eg. acetic acid, formic acid or hydrochloric acid), water or a mixture of these.

The reaction mixture can be worked up in a manner known per se. The resulting polymers can, for example, be precipitated by adding a suitable amount of a low-molecular-weight alcohol or of water. If desired, the solvent or solvent system can also be removed by distillation.

The polymers obtainable by the novel process using an anionic initiator system generally have mean molecular weights $\overline{M}_n$ in the range from 5000 to 2,000,000 g/mol, preferably from 5000 to 500,000 g/mol, and particularly preferably from 5000 to 250,000 g/mol. The molecular weight distribution $\overline{M}_w/\overline{M}_n$ is generally in the range from 1.05 to 3.5, preferably in the range from 1.05 to 2.5.

Independently of the polymerization conditions and the selected amount of vinylaromatic compound, no incorporation of, for example, vinylaromatic compounds into the polymer chains is observed. In the first step $a_1$) or $a_2$), therefore, the acrylate derivative or methacrylate derivative or mixtures of these are selectively polymerized.

The anionic polymerization may also be carried out using metallocene complexes, preferably lanthanoid metallocene complexes (lanthanocenes), in particular complexes of ytterbium, samarium or europium in which the metallic center generally has a formal positive charge of two or three. Complexes of samarium are, for example, very particularly suitable.

Using initiator systems such as [CP*$_2$SmH]$_2$ (Cp*= pentamethylcyclopentadienyl), high molecular weights with very narrow molecular weight distributions are possible at polymerization temperatures of up to 100° C., for example even with problematic acrylates. Examples of suitable initiator complexes are Cp*$_2$Yb(THF)$_2$(JP-A 02 258 808), Cp*$_2$YbMe/AlMe$_3$(EP-A 442 476), Cp*$_2$SmMe(THF)(JP-A 06 093 049 and JP-A 06 093 060) and CP*$_2$Sm(THF)$_2$(JP-A 06 306 112).

The metallocene complexes can have one or two metallocene ligands. Preferred metallocene ligands are, for example, $C_5$–$C_{50}$-cyclopentadienyl structural units, for example cyclopentadienyl $C_5H_5$ or any substituted or unsubstituted mono- or polycyclic molecular structure having in total from 5 to 50 carbon atoms which formally contains the cyclopentadienyl structural unit. Specific examples are cyclopentadienyl derivatives with mono- to pentasubstitution by $C_1$–$C_{20}$-organic or $C_1$–$C_{30}$-organosilicon radicals. These may be $C_1$–$C_{10}$-alkyl, $C_5$–$C_7$-cycloalkyl, $C_6$–$C_{15}$-aryl or aralkyl, where two neighboring radicals may also, if desired, jointly be a saturated or unsaturated cyclic group having from 4 to 15 carbon atoms, or $SiR_3$, where R is $C_1$–$C_{10}$-alkyl, $C_3$–$C_{10}$-cycloalkyl or $C_6$–$C_{15}$-aryl, examples being cyclopentadienyl, pentamethylcyclopentadienyl, methylcyclopentadienyl, ethylcyclopentadienyl, 4-butylcyclopentadienyl, trimethylsilylcyclopentadienyl and ethyl tetramethylcyclopentadienyl.

Examples of polycyclic derivatives having a cyclopentadienyl structural unit are indenyl, fluoroenyl and benzindenyl. Preference is in principle given to cyclopentadienyl structural units which form a sterically demanding metallocene ligand, pentamethylcyclopentadienyl being particularly preferred.

Examples of metallocenes employed for the novel process are lanthanoid(II) metallocenes having two metallocene ligands, particularly preferably those lanthanoid(II) metallocenes which are complexed with two cyclopentadienyl units.

The two free coordination locations on the lanthanoid(II) metallocene having two cyclopentadienyl complex ligands are filled, for example, by weakly coordinating Lewis bases, such as diethyl ether, tetrahydrofuran, dimethoxyethane or acetonitrile, tetrahydrofuran or diethyl ether being preferred. A suitable lanthanoid metal has proven to be samarium, which, in the preferred complexes, generally has a formal double or triple positive charge. An example of a particularly preferred metallocene initiator for the anionic polymerization, in particular of acrylates and methacrylates, is bis(pentamethylcyclopentadienyl)samarium-(II)bis (tetrahydrofuran) [(C$_5$Me$_5$)$_2$Sm(THF)$_2$], the preparation and characterization of which can be found, for example, in W. J. Evans, I. Bloom, W. E. Hunter, J. L. Atwood, J. Am. Chem. Soc. 1981, 193, pp. 6507–6508.

Metallocene complexes with a formal triple positive charge of the formula (IV) are also suitable

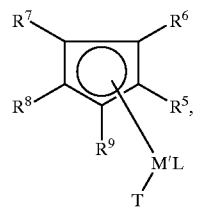

(IV)

where:

M' is lanthanum, cerium, samarium, europium, or ytterbium,

L is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^{10}$ or —$NR^{10}R^{11}$, where $R^{10}$ and $R^{11}$ are $c_1$–$C_{10}$-alkyl, $C_6$–$C_{15}$-aryl, alkylaryl, arylalkyl, fluoroalkyl or fluoroaryl having in each case from 1 to 10 carbon atoms in the alkyl radical and from 6 to 20 carbon atoms in the aryl radical, $R^5$ to $R^9$ are hydrogen, $C_1$–$C_{10}$-alkyl, from 5- to 7-membered cycloalkyl, which may itself carry a $c_1$–$C_{10}$-alkyl as substituent, $C_6$–$C_{15}$-aryl or arylalkyl, where two adjacent radicals may also, if desired, jointly be a saturated or unsaturated cyclic group having from 4 to 15 carbon atoms, or $Si(R^{12})_3$ where $R^{12}$ is $C_1$–$C_{10}$-alkyl, $C_3$–$C_{10}$-cycloalkyl or $C_6$–$C_{15}$-aryl, T is L

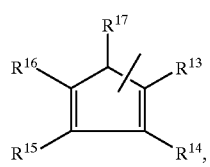

where $R^{13}$ to $R^{17}$ are hydrogen, $C_1$–$C_{10}$-alkyl, from 5- to 7-membered cycloalkyl which may itself carry a $C_1$–$C_{10}$-alkyl as substituent, $C_6$–$C_{15}$-aryl or arylalkyl, where two adjacent radicals may also, if desired, jointly be a saturated or unsaturated cyclic group having from 4 to 15 carbon atoms, or $Si(R^{18})_3$ where $R^{18}$ is $C_1$–$C_{10}$-alkyl, $C_6$–$C_{15}$-aryl or $C_3$–$C_{10}$-cycloalkyl.

Such complex compounds can be synthesized by methods known per se. Examples of corresponding preparation processes are described, inter alia, in the Journal of Organometallic Chemistry, 1993, 450, pp. 121–124. Mixtures of different metal complexes may also be employed.

For the anionic polymerization using lanthanocenes, vinylaromatic compounds, in particular styrene, are preferred as solvents. The solvents which are in principle suitable for the anionic polymerization in the novel process (see also formula III) may be used as such or in a mixture with other inert solvents.

It has, however, proven advantageous, mainly for reasons of solubility of the metallocene initiator, to use at least small amounts of a further solvent component. In principle, the abovementioned solvents and solvent systems are suitable for this. For example, tetrahydrofuran has proven suitable. The proportion of this component in the total amount of solvent is preferably in the range from 0.1 to 95% by volume, particularly preferably from 0.5 to 50% by volume, and in particular from 0.5 to 20% by volume.

In principle, the metallocene initiator, the solvent or the solvent components and the monomers may be mixed with one another in any desired sequence. For example, the metallocene initiator can be precharged, if desired in solution in a suitable solvent, eg. tetrahydrofuran, and the solvent(s) and monomer(s) are then added.

The monomer building block(s) and the solvent or the solvent system are preferably first precharged and then mixed with a metallocene initiator solution.

The reaction can be carried out, for example, in the range from −78° C. to +100° C., the range from 30° C. to +80° C. being preferred. The reaction temperature can either be held constant or increased in a controlled manner. In order to achieve high molecular weights $M_n$ and narrow molecular weight distributions, it is not harmful if the reaction mixture becomes warm within a short period of time as a result of the enthalpy of reaction which is liberated.

It has proven advantageous to treat the monomers and the solvent which are used with suitable drying agents before the reaction, in order to remove residues of water. Alumina beads may be employed, for example, for this purpose. It has also proven advantageous, especially for the achievement of reproducibly high molecular weights $M_n$, to add organoaluminum compounds or organoboron compounds to the reaction mixture. Hydrides, such as diisobutyl aluminum hydride and calcium hydride, are also suitable for this purpose. Preference is given to the use of solutions of organoaluminum compounds in inert solvents, such as toluene or hexane. Examples of suitable organoaluminum compounds are trialkyl- and triarylaluminum compounds and organoaluminum compounds containing alkyl and aryl radicals. Mixtures of these compounds are also suitable. Preference is given to trialkylaluminum compounds, especially triethylaluminum or triisobutylaluminum. However, in principle, easily hydrolyzable compounds which do not undergo any reaction with the monomer building blocks or the solvents are suitable. These are added to the monomer components and solvent components before the metallocene initiator is added.

After the molecular weight has been built up, the polymerization can be terminated, as described above for anionic initiator systems, by adding a protic substance. Mixtures of methanol and acetic acid, eg. in a ratio in the range from 100:1 to 1:100, preferably from 10:1 to 1:10, have proven especially suitable.

In a first step $a_1$) or $a_2$) of the novel process, homopolymers, copolymers or block copolymers based on acrylates and methacrylates are obtained by anionic polymerization. For example, it is possible to prepare n-butyl acrylate-2-ethylhexyl acrylate, n-butyl acrylate-methyl methacrylate, methyl methacrylate-n-butyl acrylate-methyl methacrylate or methyl methacrylate-2-ethylhexyl acrylate block copolymers.

If the abovementioned polymers are to form the base for a soft rubber graft core, preference is given in particular to acrylate monomers whose homopolymers have a glass transition temperature ($T_g$) below 0° C., preferably below −10° C. Examples of these are methyl acrylate, ethyl acrylate, n-propyl acrylate, isopropyl acrylate, n-butyl acrylate, isobutyl acrylate, tert-butyl acrylate, n-pentyl acrylate, isopentyl acrylate, n-hexyl acrylate, n-heptyl acrylate, n-octyl acrylate, ethylhexyl acrylate, n-nonyl acrylate, n-decyl acrylate, n-dodecyl acrylate, n-tetradecyl acrylate, n-hexadecyl acrylate, n-octadecyl acrylate, n-eicosyl acrylate, methoxybutyl acrylate and 2-methoxyethyl acrylate.

The content of these monomers in the graft base is preferably in the range from to 100% by weight, particularly preferably from 50 to 100% by weight, and in particular from 80 to 100% by weight.

For preparation of a soft graft base K it is preferable to use acrylate monomers of the classes of compounds i) or ii) or i) and ii) in an amount, based on the total weight of the graft base K, in the range from to 100% by weight, preferably from 50 to 100% by weight, and in particular from 80 to 100% by weight, monomers of the classes of compounds iii)

or iv) or iii) and iv) in an amount in the range from 0 to 20% by weight, preferably from 0 to 17% by weight, particularly preferably from 0 to 15% by weight, and in particular from 0 to 10% by weight and monomers of the class of compounds v) in an amount in the range from 0 to 20% by weight, preferably from 0 to 5% by weight. Depending on the monomer used, the preferred ranges for the amounts may still vary slightly.

Examples of suitable acrylate monomers of the classes of compounds i) and ii) are ethyl acrylate, n-butyl acrylate, 2-ethylhexyl acrylate, hexyl acrylate, heptyl acrylate, octyl acrylate, n-dodecyl acrylate (=lauryl acrylate), 2-ethylbutyl acrylate, 3-methylpropyl acrylate and 3-methylbutyl acrylate, n-butyl acrylate and 2-ethylhexyl acrylate being very particularly suitable.

Examples of suitable monomers of the classes of compounds iii) and iv) are the diesters of ethanediol or of butane-1,4-diol with (meth)acrylic acid and in particular dihydrodicyclopentadienyl acrylate, 2-allyloxyethyl acrylate and the allyl esters of acrylic and methacrylic acids.

The class of compounds iv) in principle also includes diacrylates and dimethacrylates of 1,n-alkylenediols, such as ethylene glycol, propylene glycol, 1,3-butylene glycol, 1,4-butylene glycol and tetraethylene glycol, and the polyfunctional acrylates and methacrylates of glycerol, pentaerythritol, inositol and similar sugar alcohols.

Examples of suitable monomers of the class of compounds v) are the (meth)acrylamides of ethylenediamine and of homologous aliphatic di- and polyamines, dimethylaminoethyl acrylate, diethylaminoethyl acrylate, 2-phenoxyethyl acrylate, 2-phenoxyethyl methacrylate, phenyl acrylate, phenyl methacrylate and methacryloylalkoxysiloxanes of the formula (V)

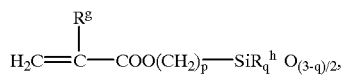

(V)

where:

$R^g$ is hydrogen or methyl, $R^h$ is $C_1$–$C_{10}$-alkyl, such as methyl, ethyl, isopropyl, n-propyl, isobutyl, n-butyl, tert-butyl or unsubstituted or substituted $C_6$–$C_{14}$-aryl., such as phenyl or tolyl, p is an integer from 0 to 7, q is 0, 1 or 2.

Examples of the last-mentioned compounds are

N,N-dimethylarylamide, N,N-diethylacrylamide,

N,N-dimethylmethacrylamide, N,N-diethylmethacrylamide,

N,N-di-isopropylacrylamide, N,N-di-n-butylacrylamide,

N,N-di-isopropylmethacrylamide, N,N-di-n-butylmethacrylamide.

In a very particularly preferred embodiment, the graft base K is made up

| from 80 to 100% by weight | of n-butyl acrylate or 2-ethylhexyl acrylate or any desired mixture of these, |
| from 0 to 20% by weight | of allyl methacrylate, allyl acrylate or dihydrodicyclopentadienyl acrylate or any desired mixture of these and |

-continued

| from 0 to 20% by weight | of one or more compounds selected from the class of compound v). |

Block copolymers may also be prepared in the first step $a_1$) or $a_2$) of the novel process. The block copolymers may have two-block of multiblock character. The latter may be linear, branched, star-shaped or of dendrimer type.

The block copolymers can be prepared as such from acrylate monomers and/or methacrylate monomers as already described for homopolymers and copolymers in the first step $a_1$) or $a_2$). Block copolymers may moreover be obtained in the presence of previously prepared homopolymers or copolymers. The procedure may likewise be carried out in reverse. Separately prepared block copolymers may also be added at any time to the reaction mixtures of the steps $a_1$), $a_2$) and b).

Particularly suitable for this are two-block and three-block copolymers in which one block is compatible or partly compatible with the soft graft base K and another block is compatible or partly compatible with the graft shell material and matrix material of the rubber-modified molding composition.

It is therefore advantageous if at least one block is made up from monomers whose homopolymers have a $T_g$ of below 0° C., preferably below −10° C. Besides this, at least one other copolymer block is made up from, for example, a methacrylate derivative, in particular methyl methacrylate.

Preference is moreover given to block copolymers in which at least one block comprises monomers having one or more double bonds in the ester unit, eg. allyl acrylate, allyl methacrylate, 2-allyloxyethyl acrylate or dihydrodicyclopentadienyl acrylate. The proportion of these monomers in the whole structure of the block is usually in the range from 0 to 99% by weight, preferably from 0 to 45% by weight, and in particular from 0 to 25% by weight.

Preference is likewise given to block copolymers which have at least one block formed from monomers which have at least one tertiary or at least one benzylic hydrogen atom in the ester radical. This also includes, for example, 2-ethylhexyl acrylate. The proportion of these monomers in the total structure of the block is usually in the range from 0 to 99% by weight, preferably from 10 to 99% by weight, and in particular from to 80% by weight.

Whichever monomer or monomer mixture is used, the homopolymers, copolymers and block copolymers obtainable using anionic polymerization in the first step $a_1$) or $a_2$) of the novel process can be prepared with a molar mass $\overline{M}_n$ in the range from 5000 to 2,000,000 g/mol, preferably from 5000 to 500,000 g/mol, and particularly preferably from 5000 to 400,000 g/mol. Thus even polymers and copolymers containing monomer units having a tertiary or benzylic hydrogen atom in the ester radical, such as 2-ethylhexyl acrylate, or having at least one double bond in the ester unit, such as allyl acrylate, can be obtained without difficulty with average molecular weights $\overline{M}_n$ of greater than 60,000 g/mol and even of greater than 100,000 g/mol.

The proportion of the graft base K in the mixture (A) is preferably in the range from 1 to 90% by weight, particularly preferably from 2 to 60% by weight, and very particularly preferably from 3 to 30% by weight.

The rubber obtained in step $a_1$) or $a_2$) of the novel process is present in a solvent or in a reaction medium, as described above.

The polymerization of the unsaturated compounds serving in step $a_1$) or $a_2$) as solvent or reaction medium for the anionic polymerization is initiated by adding commonly used free-radical initiators, as described, for example, in H. Gausepohl et al., Kunststoff-Handbuch, Polystyrol, 1996, p. 106 to the reaction mixture obtained according to step $a_1$) or $a_2$). Examples of suitable initiators are 1,1-bis(tert-butylperoxy)cyclohexane, 1,1-bis(tert-butylperoxy)-3,3,5-trimethylcyclohexane and azoisobutyronitrile. The initiators listed in the cited Kunststoff-Handbuch Polystyrol on p. 106 are also expressly incorporated herein by way of reference.

Suitable polymerization initiators are in principle peroxides, eg. peroxosulfates, azo compounds, hydroperoxides, peresters, such as dibenzoyl peroxide, and perketals.

If the rubbers obtained in step $a_1$) or $a_2$) contain no monomer units susceptible to free-radical attack, these particles are generally present in ungrafted form in the resultant molding compositions.

For the preparation of rubber-modified molding compositions in the novel process, it is preferable in the first step $a_1$) or $a_2$), to prepare rubbers or particles which can undergo free-radical grafting.

Examples of graft bases K suitable for this are preferably those which contain, as constituent of copolymers or block copolymers, (meth)acrylate monomer units containing an ester radical having a tertiary or benzylic hydrogen atom or having an unsaturated double bond. Preferred compounds in this context are those of the classes of compounds ii) and iii) defined above. Particular examples are allyl acrylate, allyl methacrylate, 2-allyloxyethyl acrylate, 2-allyloxyethyl methacrylate, dihydrodicyclopentadienyl acrylate and 2-ethylhexyl acrylate.

Under the conditions of the free-radical polymerization, the abovementioned monomer units probably form organic radicals which can serve either as grafting centers or for crosslinking of the rubber particle.

Using styrene, the preferred vinylaromatic compound, as solvent, this procedure gives impact-modified polystyrene, also known as high impact polystyrene (HIPS), in which the soft rubber particles are grafted with hard styrene polymers giving particles with soft/hard morphology embedded in a hard polystyrene matrix.

Other vinylaromatic compounds particularly preferred as respectively solvent (step $a_1$) or $a_2$)) or reaction participant (step b)) for the novel process are α-methylstyrene and styrenes having $C_1$–$C_8$-alkyl substitution on the aromatic ring, such as p-methylstyrene and tert-butylstyrene.

In a further preferred embodiment of the novel process, other olefinically unsaturated compounds, eg. those of the formula (III), may be added to the reaction mixture obtained in the first step $a_1$) or $a_2$), before step b) is begun. A method which has proven feasible for this is firstly to terminate the anionic polymerization in a conventional manner by adding a protic substance, once the build-up of molecular weight has been achieved. Suitable compounds for this are alcohols, such as methanol, ethanol or isopropanol, acids, such as formic acid or acetic acid, water or any desired mixture of these.

Examples of these olefinically unsaturated compounds added after step $a_1$) or $a_2$) include $C_1$–$C_8$-alkyl (meth) acrylates, in particular those derived from methanol, ethanol, n-propanol, isopropanol, sec-butanol, tert-butanol, isobutanol, pentanol, hexanol, heptanol, octanol and 2-ethylhexanol and especially from n-butanol. Methyl methacrylate is particularly preferred.

Other suitable monomers are maleimide, N-methyl-, N-phenyl- and N-cyclohexylmaleimide, acrylic acid, methacrylic acid, maleic acid and fumaric acid and their anhydrides, nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide, hydroxyethyl acrylate, methacrylonitrile and acrylonitrile.

Of the last-named monomers, acrylonitrile, maleic anhydride, methacrylonitrile and maleimide are preferred, acrylonitrile being particularly preferred.

The definition of the novel rubber-modified molding compositions includes not only molding compositions in which single- or multiple-shell rubber particles are embedded, but also the actual rubber solutions obtainable using the novel process.

In the second step of the novel process, the polymerization can either be carried out throughout in solution or bulk or, after a conversion of greater than 10%, be continued as suspension polymerization.

Whether the polymerization is carried out in solution or in bulk, the reaction may be terminated by removing the monomers, eg. by degassing in an extruder.

The polymerization temperature in step b) is normally from 0 to 220° C., preferably from 50 to 180° C.

The reaction mixture obtained at the end of step b) is worked up, for example in the case of the suspension polymerization, by centrifuging or filtering, or in the case of the bulk polymerization by granulating. The resultant polymer products may, for example, be washed with water and then dried in vacuo at elevated temperature.

Using the novel process, it is possible to prepare rubber-modified molding compositions which have satisfactory mechanical properties even at relatively low temperatures and which moreover can be processed in the melt without difficulty. Even at temperatures of −40° C., −50° C. and below, there is no noticeable reduction in their impact strength, notched impact strength and hole impact strength.

For example, even at temperatures of −50° C., the molding compositions obtained, even if these have a rubber proportion of only 8%, can give impact strengths (determined according to DIN 53 453-n) of greater than 20 $kjm^{-2}$, or also greater than 30 $kjm^{-2}$ and even 40 $kJm^2$.

Even at −50° C., the values obtained for hole impact strength (according to DIN 53 753. L-3-0) are regularly greater than 5 $kJm^{-2}$, and also greater than 7 or greater than 9 $kjm^{-2}$.

The rubber-modified molding compositions obtained by the novel process are distinguished, when compared with molding compositions obtained in conventional suspension or solution polymerization processes, by having not even a trace of emulsifier residues or precipitation reagent residues. The formation of specks can therefore be completely excluded. The molding compositions are moreover distinguished by very good Theological and mechanical properties and may also be processed in a known manner to give fibers, films and shaped articles. These materials escape the disadvantageous phenomenon of exudation.

The novel process moreover provides the advantage that the molding compositions can be prepared in a one-pot reaction without complicated change of the reaction medium.

Besides the components described, the rubber-modified molding compositions may also contain additives, such as lubricants and mold-release agents, pigments, dyes, flame retardants, antioxidants, stabilizers against the effect of light, fibrous and pulverulent fillers, fibrous and pulverulent reinforcing agents and antistats, in the amounts which are usual for these agents.

The novel rubber-modified molding compositions may also be a constituent of a polymer blend. Examples of blend components are thermoplastics, for example polycarbonates, polyesters, polyamides, polyalkyl methacrylates, polystyrene and styrene polymers, this term including both homo- and copolymers, and high-temperature-resistant polyether sulfones.

The suitable styrene polymers include polystyrene which is impact-modified using polybutadiene rubbers, for example high-impact polystyrene (HIPS) and those styrene copolymers, such as polystyrene-acrylonitrile, which have acrylonitrile as comonomer. It is, of course, also possible to blend the novel molding compositions with rubber-modified styrene copolymers, for example styrene polymers modified with ethylene-propylene-diene copolymer (EPDM) or with acrylate, in particular n-butyl acrylate or with diene, in particular butadiene, and preferably prepared in bulk or emulsion, such as AES, ASA or ABS. The rubber-modified styrene (co)polymers described here may either be grafted or ungrafted, but are in particular grafted.

Suitable polycarbonates are sufficiently well known. Their preparation and properties are described, for example, in Kunststoff-Handbuch 3/1 "Technische Thermoplaste, Polycarbonate, Polyacetale, Polyester, Celluloseester", ed. L. Bottenbruch, Hanser-Verlag, Munich, 1992, pp. 117–299.

Examples of suitable polycarbonates are those based on diphenols of the formula Ψ

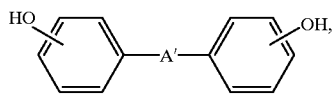

(Ψ)

where A' is a single bond, $C_1$–$C_3$-alkylene, $C_2$–$C_3$-alkylidene, $C_3$–$C_6$-cycloalkylidene or —S— or —$SO_2$—.

Examples of preferred diphenols of the formula Ψ are 4,4'-dihydroxydiphenyl, 2,2-bis(4-hydroxyphenyl)propane (bisphenol A), 2,4-bis(4-hydroxyphenyl)-2-methylbutane and 1,1-bis(4-hydroxyphenyl)cyclohexane. Other preferred diphenols are hydroquinone and resorcinol. Particularly preferred compounds are 2,2-bis(4-hydroxyphenyl)propane and 1,1-bis(4-hydroxyphenyl)cyclohexane, 1,1-bis(4-hydroxyphenyl)2,3,5-trimethylcyclohexane and 1,1-bis(4-hydroxyphenyl)-3,3,5-trimethylcyclohexane.

Suitable polyesters are likewise known per se and are described in the literature (Kunststoff-Handbuch 3/1 "Technische Thermoplaste, Polycarbonate, Polyacetale, Polyester, Celluloseester", ed. L. Bottenbruch, Hanser-Verlag, Munich, 1992, pp. 7–115). They are generally derived from an aromatic dicarboxylic acid, where the aromatic framework can also be substituted, for example, with halogen, such as chlorine or bromine, or with straight-chain or branched alkyl, preferably $C_1$–$C_4$. Preferred dicarboxylic acids are naphthalenedicarboxylic acid, terephthalic acid and isophthalic acid or dicarboxylic acids which may be replaced to a certain extent (up to 10 mol %) by aliphatic or cycloaliphatic dicarboxylic acids. An example of a particularly preferred polyester component is polybutylene terephthalate. The viscosity number of the polyesters is generally in the range from 60 to 200 ml/g (measured in a 0.5% strength by weight solution in a mixture of phenol and o-dichlorobenzene in a weight ratio of 1:1, at 25° C.).

Suitable polyamides are known per se, preference generally being given to those which have an aliphatic and partially crystalline or partially aromatic and amorphous construction. Use may likewise be made of polyamide blends, obtainable, for example, under the trade name Ultramid® (BASF AG).

Examples of suitable polyether sulfones are compounds such as the product marketed as Ultrason® E or S (BASF AG).

The term polymethacrylates includes in particular polymethyl methacrylate (PMMA) and the copolymers based on methyl methacrylate with up to 40% by weight of another copolymerizable monomer. Polymeric materials of this type are marketed under the brands Lucryl® (BASF AG) and Plexiglas® (Röhm GmbH).

The novel molding compositions can be prepared by mixing processes known per se at temperatures of generally from 150 to 300° C., for example by melting in an extruder, Banbury mixer or compounder or on a roll mill or calender. However, the components may also be mixed cold, without melting, and the mixture consisting of powder or granules melted and homogenized only when it is processed.

An extruder is preferably used as mixing apparatus.

EXAMPLES

Examples 1 to 8 were carried out with exclusion of oxygen and moisture using the customary inert gas technique.

The number- and weight-average molecular weights $M_n$ and $M_w$ were determined by gel permeation chromatography (GPC) in tetrahydrofuran at 35° C. relative to a narrowly distributed polymethyl methacrylate standard. A Waters 410 refractive index (RI) detector was used.

The monomeric acrylates and methacrylates and styrene were purified by flushing with nitrogen and storing over alumina and then distilled in vacuo.

The polyvinylpyrrolidone used was the commercial product Luviskol® K 90 from BASF AG. The Luviskol® K 90 used had a K value, measured as 1% strength solution in water at 25° C., of 90; (for the determination of K value, see Cellulose Chemie, 1932, 13, pp. 358–364).

(The synthesis of $(C_5Me_5)_2$ Sm $(THF)_2$ was based on a specification of Schumann et al., J. New Chem. 1995, 19, p. 491.

The polyvinyl alcohol used was the commercial product Ertivinol® from Erkol, S. A. Tetrasodium diphosphate was obtained from Merck.

A. Anionic Polymerization in Styrene

Example 1

Preparation of Polyethylhexyl Acrylate 2.25 ml of Al (isobutyl)$_3$ (1 M in toluene) were added dropwise at room temperature to 113 ml of 2-ethylhexyl acrylate (EHA), and the resultant mixture was transferred into 300 ml of styrene. A solution of 608 mg of $(C_5Me_5)_2Sm(THF)_2$ in ml of THF was rapidly added at −20° C., with vigorous stirring. The temperature rose to +39° C. After 1 h, the polymerization was terminated by adding 1 ml of a methanol/acetic acid mixture (10/1).

Example 2

Preparation of poly[2-ethylhexyl acrylate-co-dihydrodicyclopentadienyl acrylate] having a proportion of 10% by weight of dihydrodicyclopentadienyl acrylate 2.25 ml of Al (isobutyl)$_3$ (1 M in toluene) were added dropwise at room temperature to 101.5 ml of EHA and 9.3 ml of dihydrodicyclopentadienyl acrylate (DCPA) in 300 ml of styrene. A solution of 595 mg of $(C_5Me_5)_2Sm(THF)_2$ in ml of THF was rapidly added at −20° C., with vigorous stirring. The temperature rose to +35° C. After 1 h, the polymerization was terminated by adding 1.2 ml of a methanol/acetic acid mixture (1:1) and 3.6 mg of 4-tert-butylpyrocatechol.

In accordance with Example 2, copolymers were prepared having 2-ethylhexyl acrylate as main monomer component and allyl methacrylate (Ex. 3) and 2-allyloxyethyl acrylate (6.6 instead of 10% by weight) (Ex. 4), respectively, as second component.

In Example 5, unlike Example 2, the amount of dihydrodicyclopentadienyl acrylate was selected so that 7.5% by weight was incorporated into the copolymer (see also Table 1).

Example 6

Preparation of poly[2-ethylhexyl acrylate-co-dihydrodicyclopentadienyl acrylate-co-lauryl acrylate]

2.75 ml of Al (isobutyl)$_3$ (1 M in toluene) were added dropwise at room temperature to 67.6 ml of EHA, 9.3 ml of DCPA, 34.5 ml of lauryl acrylate (LA) and 300 ml of styrene. A solution of 598 mg of $(C_5Me_5)_2Sm(THF)_2$ in ml of THF was rapidly added at −20° C., with vigorous stirring. The temperature rose to +32° C. After 1 h, the polymerization was terminated by adding 1.2 ml of a methanol/acetic acid mixture (1:1) and 3.6 mg of 4-tert-butylpyrocatechol.

Example 7

Preparation of poly[methyl methacrylate-b-2-ethylhexyl acrylate-b-methyl methacrylate]

2.25 ml of Al (isobutyl)$_3$ (1 M in toluene) were added dropwise at room temperature to 45 ml of methyl methacrylate (MMA) and 45 ml of EHA in 300 ml of styrene. A solution of 1200 mg of $(C_5Me_5)_2Sm(THF)_2$ in 30 ml of THF was rapidly added at −10° C., with vigorous stirring. The temperature rose to +43.5° C. 30 minutes after the addition of the samarocene, the polymerization was terminated by adding 1.2 ml of a methanol/acetic acid mixture (1:1) and 3.6 mg of 4-tert-butylpyrocatechol.

Example 8

Preparation in a tubular reactor of poly[2-ethylhexyl acrylate-co-dihydrodicyclopentadienyl acrylate] having a proportion of 10% by weight of dihydrodicyclopentadienyl acrylate A low-pulsation preparative HPLC pump of Dynamax SD1 type from Rainin was used to convey initiator solution, additive solution and monomer solution. The reaction chamber was a metal tube of length 10 m, having an internal diameter of 1.17 mm and cooled to −20° C.

A 0.0145 molar solution of lithium diisopropylamide in ethylbenzene (50 ml/min) and a 0.144 molar solution of lithium 2-methoxyethoxide in ethylbenzene (25 ml/min) were mixed with one another in a first mixing nozzle, cooled to −20° C. and, via a 2nd mixing nozzle, mixed with a monomer solution, cooled to −20° C., containing 0.87 mol/l of EHA and 0.10 mol/l of DCPA in styrene (75 ml/min). The average residence time in the tubular reactor was 4.3 sec. At the end of the tube, a 1:1 mixture of methanol and acetic acid (2 ml/min) was mixed in as terminating reagent via another nozzle. GC analysis gave the conversion as 95% for EHA and 96% for DCPA. A glass transition temperature $T_g$ of −55° C. was determined for the resultant copolymer, using DSC analysis (heating rate: 20° C./min).

Table 1 gives further data on the rubbers prepared in Examples 1 to 8.

| Ex. | Comonomer[a] [% by wt.] | $M_w$[b] | $M_w/M_n$[b] |
|---|---|---|---|
| 1 | — | 275300 | 1.5 |
| 2 | 10 DCPA | 393300 | 1.6 |
| 3 | 10 AMA | 313700 | 1.5 |
| 4 | 6, 6 AOEA | 305000 | 1.4 |
| 5 | 7, 5 DCPA | 361500 | 1.7 |
| 6 | 10 DCPA/30 LA | 487000 | 2.4 |
| 7 | 50 MMA | 97100 | 1.3 |
| 8 | 10 DCPA | 218900 | 2.2 |

[a]AMA: allyl methacrylate, DCPA: dihydrodicyclopentadienyl acrylate, AOEA: 2-allyloxyethyl acrylate, LA: lauryl acrylate, MMA: methyl methacrylate
[b]determined by gel permeation chromatography using a polymethyl methacrylate standard

B. Free-Radical Polymerization

Examples 9 to 16

Styrene and, if desired, acrylonitrile, and likewise benzoyl peroxide (0.1% by weight, based on the amount of monomer) and, if desired, tert-dodecyl mercaptan were added to a solution, obtained as in Examples 1 to 7, of polyethylhexyl acrylate homopolymer or polyethylhexyl acrylate copolymer in styrene. The polymerization was carried out in a steel reactor provided with an anchor stirrer. The pro porti on by weight of polyethylhexyl acrylate homopolymer or polyethylhexyl acrylate copolymer (the proportion of polyethylhexyl acrylate in the block copolymers being included in the calculation in Examples 17 and 18) was 8% by weight in each case, based on the amount of monomers and (co)polymers used.

To remove oxygen from the reaction solution, a nitrogen pressure of 3 bar was applied and the pressure then released. The polymerization temperature was brought to 86° C., with stirring 150 rpm). After about 30% conversion (see Table 2), 0.1 mol % of dicumyl peroxide was added, and after a further minutes an aqueous solution containing Luviskol® K90 (1.0% by weight, based on the amount of water used), sodium diphosphate (0.1% by weight, based on the amount of water used) and Ertivinol® 30/92 (0.3% by weight, based on the amount of water used).

The volume ratio of aqueous solution to polymerized monomer solution was 3.3:1.

The resultant dispersion was held for 3 h at 110° C., with vigorous stirring (300 rpm), for a further 3 h at 130° C. and finally for 6 h at 140° C. After cooling, the polymer product was isolated by means of filtration and dried overnight at 60° C. in vacuo. (Other polymerization parameters are given in Table 2).

Example 17

To the polymerization mixture obtained as in Example 3, sufficient of the polymerization mixture obtained as in Example 7 was added to give a proportion of poly[methyl methacrylate-b-2-ethylhexyl acrylate-b-methyl methacrylate] in the reaction mixture of 4% by weight, based on the EHA/AMA copolymer and the amount of monomers. The procedure described in Examples 9 to 16 was then followed. Other reaction parameters are given in Table 2.

Example 18

The procedure of Example 17 was used, except that the polymerization mixture obtained as in Example 2 was used (see also Table 2).

The polymer products obtained as in Examples 9 to 18 were injection-molded at a melt temperature of 240 °C. and a mold temperature of 60° C. to give small molded bars.

These moldings were used to determine hole impact strength (HS) according to DIN 53 753-L-3-0 (issue of 4/81), impact strength (IS) according to DIN 53 453-N (issue of 5/75) and notched impact strength (NS) according to DIN 53 453-K. The melt volume index (MVI) was determined according to DIN 53 735 at a temperature of 200° C. and 21.6 kp. The test results are given in Table 3.

TABLE 3

| Ex. | Molded bar from molding composition of Ex. | MVI 10 min/ 21.6 kp | Impact strength at [kJm$^{-2}$] | | | | | Notched impact strength at [kJm$^{-2}$] | | | |
|---|---|---|---|---|---|---|---|---|---|---|---|
| | | | 23° C. | 0° C. | −20° C. | −40° C. | −50° C. | 23° C. | 0° C. | −20° C. | −40° C. |
| 19 | 9 | 10.9 | 18.4 | — | 14.6 | — | — | 3.6 | — | 2.3 | — |
| 20 | 10 | 107.4 | 17.9 | 15.8 | 15.4 | — | — | 2.2 | 1.8 | 1.9 | — |
| 21 | 11 | 7.9 | 54.6 | 56.7 | 49.0 | 41.0 | 40.6 | 6.4 | 3.6 | 2.8 | 2.3 |
| 22 | 12 | 3.8 | 26.7 | 27.5 | 25.2 | — | — | 3.6 | 2.7 | 2.4 | — |
| 23 | 13 | 99.9 | 15.3 | 15.0 | 13.0 | — | — | 2.5 | 1.8 | 1.8 | — |
| 24 | 14 | 5.4 | 31.3 | 30.5 | 34.6 | — | — | 4.6 | 3.5 | 2.7 | — |
| 25 | 15 | 9.3 | 28.0 | 23.0 | 22.0 | 22.0 | — | 4.3 | 3.7 | 2.5 | 2.1 |
| 26 | 16 | 6.5 | 54.8 | 52.7 | 47.9 | 43.1 | 39.6 | 5.8 | 4.2 | 2.5 | 2.2 |
| 27 | 17 | 4.4 | 20.2 | 20.8 | 20.6 | — | — | 3.8 | 2.8 | 2.2 | — |
| 28 | 18 | 13.7 | 36.0 | 33.1 | 29.2 | — | — | 3.2 | 3.0 | 2.5 | — |

| Ex. | Molded bar from molding composition of Ex. | MVI 10 min/21.6 kp | Hole impact strength at [kJm$^{-2}$] | | | | |
|---|---|---|---|---|---|---|---|
| | | | 23° C. | 0° C. | −20° C. | −40° C. | −50° C. |
| 19 | 9 | 10.9 | 7.4 | — | 7.6 | — | — |
| 20 | 10 | 107.4 | 7.6 | 6.9 | 6.3 | — | — |
| 21 | 11 | 7.9 | 13.1 | 11.4 | 11.8 | 9.8 | 10.0 |
| 22 | 12 | 3.8 | 10.6 | 9.7 | 8.9 | — | — |
| 23 | 13 | 99.9 | 6.7 | 5.9 | 5.8 | — | — |
| 24 | 14 | 5.4 | 9.6 | 9.4 | 7.9 | — | — |
| 25 | 15 | 9.3 | 8.7 | 8.3 | 7.8 | 7.1 | — |
| 26 | 16 | 6.5 | 12.9 | 11.9 | 11.6 | 9.4 | 8.8 |
| 27 | 17 | 4.4 | 8.6 | 9.2 | 8.9 | — | — |
| 28 | 18 | 13.7 | 9.5 | 8.1 | 7.5 | — | — |

TABLE 2

| Ex. | (Co) polymer solution$^{a)}$ of Ex. | Styrene$^{b)}$ [% by wt.] | Acrylonitrile$^{b)}$ [% by wt.] | t-Dodecyl mercaptan$^{c)}$ [% by wt.] | Conversion before addition of the aqueous phase [%] |
|---|---|---|---|---|---|
| 9 | 1 | 69 | 23 | 0 | 33.5 |
| 10 | 2 | 92 | 0 | 0.08 | 34.4 |
| 11 | 2$^{d)}$ | 69 | 23 | 0.08 | 28.3 |
| 12 | 3 | 69 | 23 | 0.08 | 28.6 |
| 13 | 3$^{e)}$ | 92 | 0 | 0.08 | 38.9 |
| 14 | 4 | 69 | 23 | 0.10 | 29.3 |
| 15 | 5 | 69 | 23 | 0.10 | 27.3 |
| 16 | 6 | 69 | 23 | 0.10 | 32.8 |
| 17 | 3 + 7$^{f)}$ | 67.5 | 22.5 | 0.10 | 29.5 |
| 18 | 2 + 7$^{f)}$ | 67.5 | 22.5 | 0.10 | 29.6 |

$^{a)}$The total rubber copolymer portion likewise includes polyethylhexyl acrylate incorporated into the block copolymers as in Examples 17 and 18 and was 8% by weight
$^{b)}$Based on the total amount of (co) polymer and monomers used
$^{c)}$Based on the amount of monomers used
$^{d)}$M$_w$ = 392,000 g/mol, M$_w$/M$_n$ = 1.8
$^{e)}$M$_w$ = 313,700 g/mol, M$_w$/M$_n$ = 1.5
$^{f)}$6% by weight of EHA copolymer + 4% by weight of block copolymer

We claim:

1. A process for preparing rubber-modified molding compositions, which comprises
    a$_1$) anionic polymerization of a mixture (A) comprising acrylate derivatives or methacrylate derivatives or acrylate derivatives and methacrylate derivatives and a solvent, and comprising olefinically unsaturated compounds which are not acrylate derivatives or methacrylate derivatives, to give a (co)polymer comprising acrylate monomers whose homopolymers have a glass transition temperature below 0° C., or
    a$_2$) sequential anionic polymerization of acrylate derivatives or methacrylate derivatives or acrylate derivatives and methacrylate derivatives in the presence of a solvent which comprises olefinically unsaturated compounds, to give block copolymers having at least one block made from monomers whose homopolymers have a glass transition temperature below 0° C., and
    b) subjecting the reaction mixture obtained in a$_1$) or a$_2$) or a$_1$) and a$_2$) to a free-radical-initiated polymerization, optionally after adding further unsaturated compounds.

2. A process for preparing rubber-modified molding compositions as claimed in claim 1, wherein the mixture (A) used in step a$_1$) comprises (i) compounds of the formula (I)

 (I), where
R$^a$ is hydrogen or methyl, and
R$^b$ is C$_1$–C$_{20}$-n-alkyl, isopropyl, isobutyl, isopentyl or tert-butyl,
(ii) compounds of the formula (II)

 (II)

where
R$^c$ is hydrogen or methyl, and
CR$^d$R$^e$R$^f$ is 2-methylpropyl, 2-methylbutyl, 2-methylhexyl, 2-methyloctyl, 2-ethylbutyl, 2-ethylpentyl, 2-ethylhexyl, 2-ethyloctyl, 2-phenylethyl, 2-phenylpropyl, 2-phenylbutyl, 2-phenylpentyl, 2-phenylhexyl, 2-phenyloctyl, 3-methylpropyl, 3-methylbutyl, 3-methylpentyl, 3-methylhexyl, 3-methyloctyl, 3-ethylpentyl, 3-ethylhexyl or 3-ethyloctyl,
(iii) acrylate compounds or methacrylate compounds having one or more double bonds in the ester moiety,
(iv) di- or poly(meth)acrylates of di- or polyhydric alcohols, or
(v) acrylamides or methacrylamides, nitrogen-functional acrylates or methacrylates, aromatic or araliphatic esters of acrylic or methacrylic acid or methacrylates or acrylates substituted with functional groups based on elements of groups IVA, VA, VIA, VIIA of the Periodic Table of the Elements, or step a$_2$) uses
(i) compounds of the formula (I)

 (I), where
R$^a$ is hydrogen or methyl, and
R$^b$ is C$_1$–C$_{20}$-n-alkyl, isopropyl, isobutyl, isopentyl or tert-butyl,
(ii) compounds of the formula (II)

 (II)

where
R$^c$ is hydrogen or methyl, and
CR$^d$R$^e$R$^f$ is 2-methylpropyl, 2-methylbutyl, 2-methylhexyl, 2-methyloctyl, 2-ethylbutyl, 2-ethylpentyl, 2-ethylhexyl, 2-ethyloctyl, 2-phenylethyl, 2-phenylpropyl, 2-phenylbutyl, 2-phenylpentyl, 2-phenylhexyl, 2-phenyloctyl, 3-methylbutyl, 3-methylpentyl, 3-methylhexyl, 3-methyloctyl, 3-ethylpentyl, 3-ethylhexyl or 3-ethyloctyl,
(iii) acrylate compounds or methacrylate compounds having one or more double bonds in the ester moiety,
(iv) di- or poly(meth)acrylates of di- or polyhydric alcohols, or
(v) acrylamides or methacrylamides, nitrogen-functional acrylates or methacrylates, aromatic or araliphatic esters of acrylic or methacrylic acid or methacrylates or acrylates substituted with functional groups based on elements of groups IVA, VA, VIA, VIIA of the Periodic Table of the Elements.

3. A process as claimed in claims 1, wherein the compounds used in step a$_1$) are (i) ethyl acrylate, n-butyl acrylate, n-hexyl acrylate, n-heptyl acrylate, n-octyl acrylate or n-dodecyl acrylate,
(ii) 2-ethylhexyl acrylate, 2-ethylbutyl acrylate, 3-methylpropyl acrylate or 3-methylbutyl acrylate,
(iii) allyl acrylate, allyl methacrylate, dihydrodicyclopentadienyl acrylate, dihydrodicyclopentadienyl methacrylate, 2-allyloxyethyl acrylate, 2-allyloxyethyl methacrylate, 3-vinylbenzyl acrylate, 3-vinylbenzyl methacrylate, 4-vinylbenzyl acrylate or 4-vinylbenzyl methacrylate,
(iv) butanediol diacrylate, butanediol dimethacrylate, ethanediol diacrylate, ethanediol dimethacrylate, glycerol triacrylate or glycerol trimethacrylate,
(v) N,N-dimethylacrylamide, N,N-diethylacrylamide, N,N-dimethylmethacrylamide, N,N-diethylmethacrylamide, N,N-diisopropylacrylamide, N,N-di-n-butylacrylamide, N-N-diisopropylmethacrylamide, N,N-di-n-butylmethacrylamide, glycidyl acrylate or glycidyl methacrylate or the compounds used in step a$_2$) are
(i) ethyl acrylate, n-butyl acrylate, n-hexyl acrylate, n-heptyl acrylate, n-octyl acrylate, n-dodecyl acrylate or methyl methacrylate,
(ii) 2-ethylhexyl acrylate, 2-ethylbutyl acrylate, 3-methylpropyl acrylate or 3-methylbutyl acrylate,
(iii) allyl acrylate, allyl methacrylate, dihydrodicyclopentadienyl acrylate or 2-allyloxyethyl acrylate,
(iv) butanediol diacrylate, butanediol dimethacrylate, ethanediol diacrylate or ethanediol dimethacrylate,
(v) N,N-dimethylacrylamide, N,N-diethylacrylamide, N,N-dimethylmethacrylamide, N-N-diethylmethacrylamide, N,N-diisopropylacrylamide, N,N-di-n-butylacrylamide, N,N-diisopropylmethacrylamide, N,N-di-n-butylmethacrylamide, glycidylacrylamide or glycidyl methacrylate.

4. A process as claimed in claim 1, wherein the olefinically unsaturated compounds used comprise vinylaromatic compounds.

5. A process as claimed in claim 1, wherein inert, polar or nonpolar aprotic solvents are used as solvent component.

6. A process as claimed in claim 1, wherein the solvents used comprise olefinically unsaturated compounds.

7. A process as claimed in claim 6, wherein the olefinically unsaturated compounds used comprise vinylaromatic compounds.

8. A rubber-modified molding composition produced by the process of claim 1.

9. A polymer blend comprising rubber-modified compositions as claimed in claim 8 with one or more thermoplastic polymers.

10. The process of claim 1, wherein no further unsaturated compounds are added in step b).

11. The process of claim 1, wherein further unsaturated compounds are added in step b).

12. Fibers, films or moldings produced from the rubber-modified molding compositions of claim 8.

13. A polymer blend as claimed in claim 9, wherein said one or more thermoplastic polymers are selected from the group consisting of styrene polymers, polycarbonates, polyesters, polyamide, polyalkyl methacrylate and polyether sulfones.

* * * * *